United States Patent
Sieling

[19]

[11] Patent Number: 6,062,165
[45] Date of Patent: May 16, 2000

[54] APPARATUS FOR AND METHOD OF FARMING

[76] Inventor: Nicolaas Laurisse Sieling, Murray-Gwynne Farm, The Coach Road, Mulwalla, NSW 2647, Australia

[21] Appl. No.: 09/060,258

[22] Filed: Apr. 15, 1998

[51] Int. Cl.[7] .................. A01K 1/00; A01K 3/00
[52] U.S. Cl. .................. 119/14.03; 119/502
[58] Field of Search .................. 119/14.03, 510, 119/512, 502, 518, 14.01, 14.04; 256/1; 239/177.1

[56] References Cited

U.S. PATENT DOCUMENTS

| | | | |
|---|---|---|---|
| 4,172,556 | 10/1979 | Standal | 239/177.1 |
| 4,445,460 | 5/1984 | Stencil | 119/14.03 |
| 4,535,723 | 8/1985 | Gealy | 119/14.03 |
| 4,721,061 | 1/1988 | McNatt | 119/14.03 |
| 5,572,954 | 11/1996 | Elkins | 119/502 |

*Primary Examiner*—Thomas Price

*Attorney, Agent, or Firm*—Young & Thompson

[57] ABSTRACT

A farming system is disclosed in which an enclosure is constructed at the center of a circular block of grazing land. Typically a milking shed is located in the enclosure for dairy cows grazed on the land. The land is divided into sectors by fencing extending outwardly from the enclosure. The land is irrigated by a center pivot irrigator programmed to irrigate the sectors selectively. Gates are erected around the enclosure to allow the animals to move selectively between the sectors and the enclosure. The fencing may be movable and be located to define a wedge shaped paddock which moves around the block. Alternatively fixed fencing may be provided which divides the land into a series of paddocks between which the animals move selectively. The outer end of at least the forward movable fence may be carried on a vehicle which is steered by sensing a fence around the perimeter of the block and moves automatically around the block. The enclosure may be provided with an annular passageway for the animals located inside the perimeter gates, and a cross passageway and has an outer periphery in which is provided the gates for allowing the animals in the herd to move between the sectors and the enclosure.

28 Claims, 6 Drawing Sheets

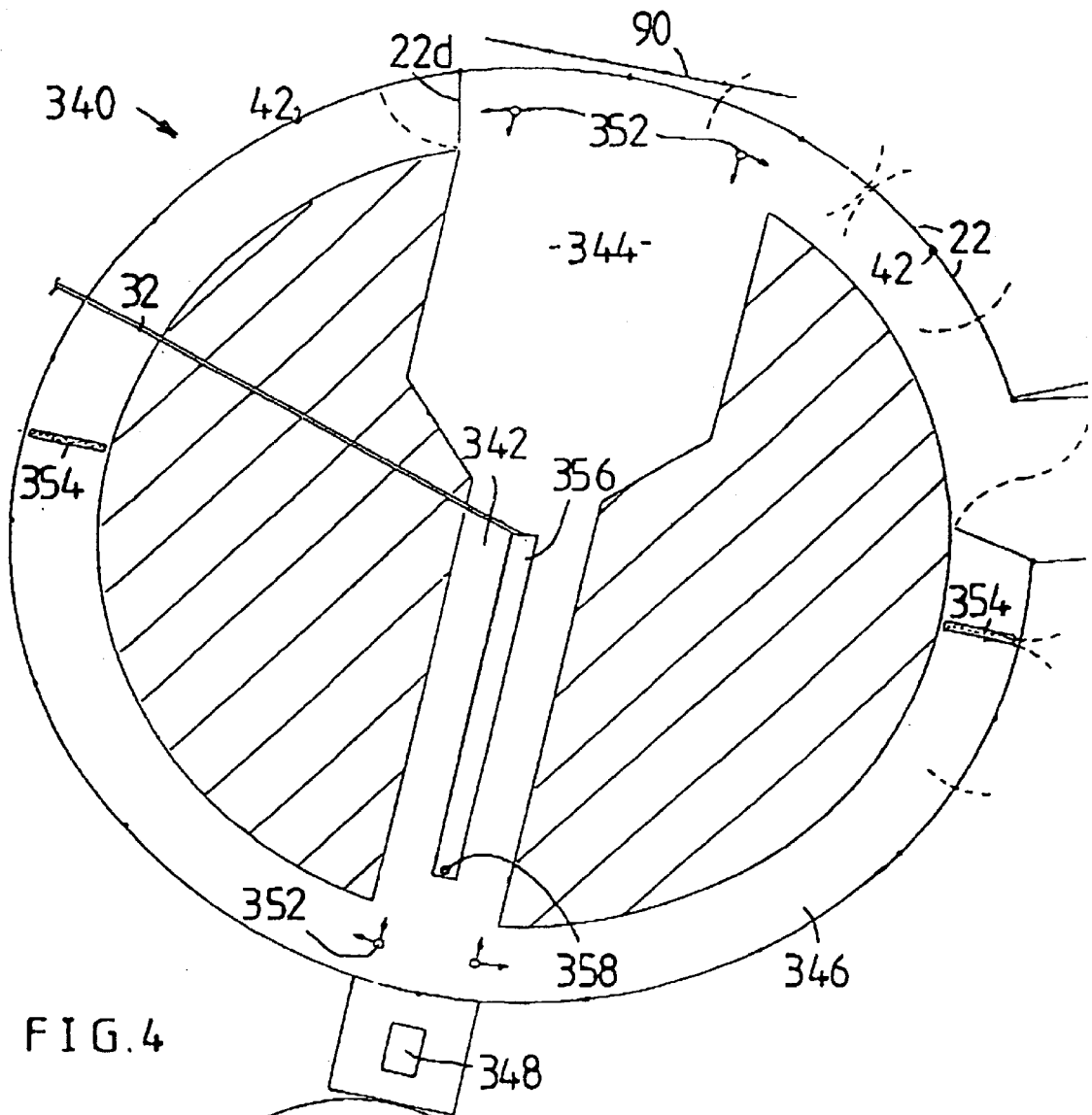
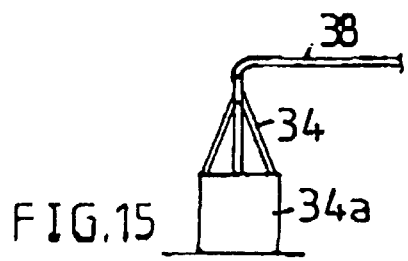

APPARATUS FOR AND METHOD OF FARMING

FIELD OF THE INVENTION

This invention relates to a method of, and apparatus for, farming.

BACKGROUND OF THE INVENTION

In traditional pastoral farming practice, farms are commonly divided by fencing into sectors which in New Zealand are called "paddocks". The livestock are let into a paddock to graze until the pasture in that paddock is exhausted. At that stage, the livestock are let into another of the paddocks to enable the pasture in the first paddock to regrow.

When dairy cows are raised by such traditional practice, much time is occupied in moving the cows between the milking shed and the paddocks. Moreover, there is a capital cost involved in the construction of the raceways (i.e. the walkways which the cows use in this process) and the land which they occupy reduces the land available for grazing. To add to this, raceways often require to be metalled (i.e. dressed with gravel) and the metal increases the risk of bruising the cows' feet, A method of intensive dairy farming has previously been proposed in which dairy cattle are grazed in a circular block of land which is served by a center pivot irrigator which rotates about a pivot point located at the center of the block. Two movable fences are provided which extend from the center point to the boundary of the block and define a paddock the position of which can be changed by moving the fences around the center point. Over time, the paddock is thus moved around the entire block.

It is also known to graze cattle in a circular block of land which is divided into a number of wedge shaped paddocks by fences which extend radially from the center of the block. The land is also served by a center pivot irrigator which rotates about the center of the block.

While these latter two methods would undoubtedly increase the rate of growth of pasture, they do not appear to address the issues raised above in connection with the location of the milking shed.

SUMMARY OF THE INVENTION

According to the invention, there is provided apparatus for farming including an enclosure for enclosing animals which enclosure is located on a block of land on which the animals are grazed, fencing means which divides the land into sectors extending from the enclosure, irrigator means arranged to irrigate the sectors selectively, and means for allowing a herd of the animals to move selectively between the sectors and the enclosure.

Also according to the invention, there is provided a method of farming including the steps of providing an enclosure for enclosing animals which enclosure is located on a block of land on which the animals are grazed, providing fencing means which divides the land into sectors extending from the enclosure, irrigator means arranged to irrigate the sectors selectively, and providing means for allowing a herd of the animals to move selectively between the sectors and the enclosure.

In one form of the invention the fencing means includes movable fencing which defines a sector which is located in a position which can be changed by moving the fencing around the enclosure.

Advantageously, the movable fencing comprises first and second fence arrangements which extend from the enclosure and are movable independently around the enclosure.

According to one aspect of the invention, means is provided for moving an outer end of at least one of the fencing arrangements automatically around the enclosure. Advantageously, said means comprises a vehicle and means is provided to cause the vehicle to move in a substantially circular path around the enclosure.

According to yet another aspect of the invention, a substantially circular fencing arrangement is provided around the block of land for confining the animals within the block, the means to cause the vehicle to move in the substantially circular path around the enclosure including means arranged to steer the vehicle by sensing the circular fencing arrangement.

In another form of the invention the fencing means includes a series of spaced fence arrangements which are located in substantially fixed positions and extend over the land from the enclosure.

According to one aspect of the invention the enclosure is provided with a passageway which extends around the enclosure and has an outer periphery in which is provided the means for allowing the animals in the herd to move between the sector and the enclosure, said means comprising a number of closures selected ones of which can be opened to give access between the sector and the enclosure.

It is believed that an enclosure of this form for livestock has inventive merit in its own right, i.e. whether as part of the apparatus as claimed herein or not.

In one form of the invention the outer periphery of the enclosure is substantially circular.

In one form of the invention, applicable to the farming of dairy cows or other animals which are milked, a dairy is provided in the enclosure for milking the animals.

According to one aspect of the invention, the dairy has an entrance and an exit and the passageway has an inner periphery within which the dairy is located, means being provided for giving access from the inner periphery of the passageway to the entrance of the dairy and for giving access to the passageway from the exit of the dairy.

Advantageously, means is provided for moving the fencing in a substantially circular path around the enclosure.

Also advantageously, the irrigator means is arranged to move around the enclosure in a substantially circular path.

In one form of the invention the irrigator means comprises a center pivot irrigator.

BRIEF DESCRIPTION OF THE DRAWINGS

Further aspects of the invention will appear from the accompanying drawings in which various embodiments of the invention are illustrated by way of example and in which:

FIG. 4 is a plan view of yet another layout of an enclosure;

FIG. 15 is a schematic view of a support arrangement for the inner end of a center pivot irrigator;

DETAILED DESCRIPTION OF EXAMPLES OF THE INVENTION

Figure 1:
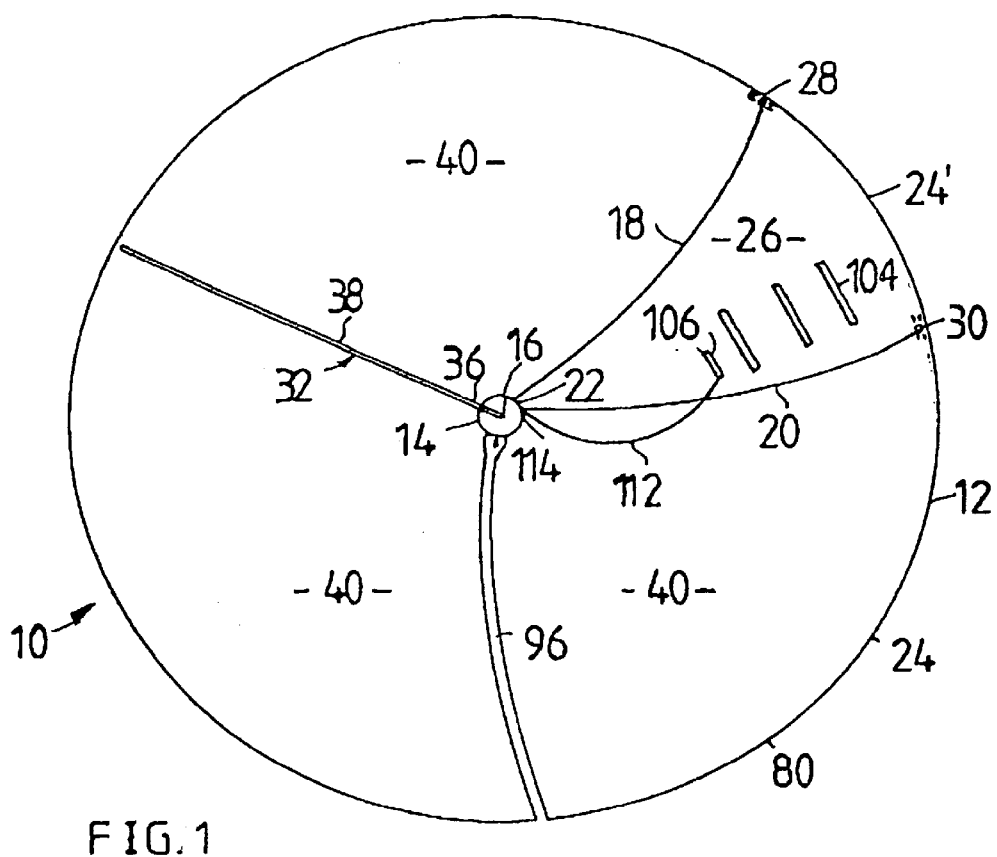
FIG. 1 is a plan view of a block of land 10 having a circular boundary 12.

The invention is not necessarily applicable only to land with a circular boundary. However, referring first to FIG. 1, the invention is exemplified in the present instance by the provision of:

the circular enclosure 14 located at the center 16 of the circular block of land 10;

a fencing arrangement for fencing a herd of animals (in the present case dairy cows) within a sector 26 of the land, the fencing arrangement including two movable fences 18, 20 and a series of gates 22 for allowing the animals in the herd To move between the enclosure and the sector 26; and a vehicle 28 for moving the first fence 18, and means, in the present case a second vehicle 30, for moving the second fence 20 so that over time the fences 18, 20 move around the enclosure and traverse the entire block of land.

In the context of this specification the terms "fence" and "fencing" include wire fencing, wooden fencing, fencing comprising so called hot wire and/or hot tape, gating and in principle include any structure for keeping animals from straying outside a defined area and which is suitable for putting the invention into practice.

It is convenient to refer to the wedge shaped sector 26 between the fences 18, 20 as a "paddock" in order to distinguish it from the sector 40 comprising the remainder of the block of land within the boundary 12.

In the present example of the invention, the fences 18, 20 and thus the paddock 26 extends between the enclosure 14 and the boundary 12.

A fixed perimeter fence 24 may be erected around the boundary 12 in which case the fencing arrangement around the paddock may include a portion 24' of the perimeter fence 24.

Where, as in the present case the land is used for grazing dairy cows, the enclosure 14 comprises a milking facility which is discussed in further detail below. However, the invention is not necessarily restricted to the grazing of dairy cows and the enclosure 14 may thus, where the invention is applied to a form of animal husbandry other than dairying, be provided for other purposes. Where the land is grazed by beef cattle for example, the enclosure may comprise a feeding platform.

In the present example, a mobile overhead irrigation apparatus 32 is provided which is also arranged to traverse the land. This is especially advantageous for land with a circular boundary 12 in which case the irrigation facility 32 can be substantially of a conventional type known as a center pivot irrigator. Such irrigators are available commercially from Renke and T & L, both of which are U.S. companies. In the present case a support structure 34 in the form, for example, of a pylon is located at the center of the land. The support structure 34 is supplied as part of the irrigator and supports an inner end 36 of an irrigation boom 38 which spans the land between the support structure 34 and the boundary 12 and is arranged to traverse the land by rotating about the support structure 34. The boom 38 is provided with a series of spray nozzles (not shown) which spray water on the land.

In the present example of the invention, the support structure 34 is located at the center of the enclosure 14. The irrigation boom 38 is arranged so that no water is sprayed over the enclosure 14, at least for purposes of irrigating the land. Where a commercially available irrigator 32 is used, this can be effected simply by closing off those spray nozzles which are located over the enclosure 14.

Figure 13:
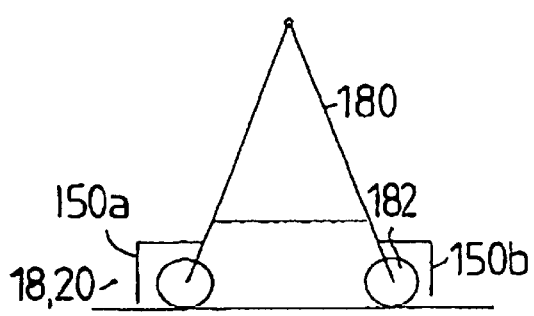
FIG. 13 is a schematic side view of a means for automatically reversing the direction of movement of a mobile irrigator.
Figure 12:
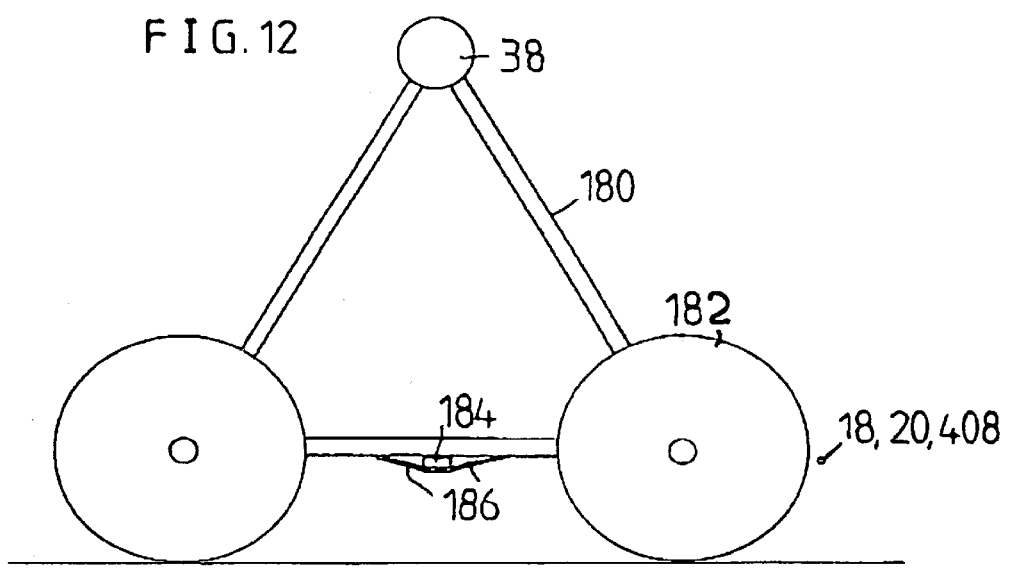
FIG. 12 is a somewhat schematic side view of part of the mobile irrigator.

The irrigation boom 38 is also supported above the ground by wheeled A-frame structures spaced from the support structure 34 and located at intervals along the length of the boom. One of these A-frame structures is shown at 180 in FIG. 12 and indicated schematically in FIG. 13. The wheels 182 are driven to move the boom over the ground. It is not necessary to describe these components in detail since they are part of the commercially available irrigator. The movement of the irrigator 32 may be automated and controlled by a programmable electronic processor. In one example of the invention, the irrigator may be programmed so that the boom 38 does not pass over the paddock 26. This has the advantage that it is not necessary to make any arrangement for the irrigator to ride over the fences 18, 20. To this end the irrigator is arranged to oscillate alternately clockwise and anticlockwise around the sector 40 of land outside the paddock 26. The programme is thus advantageously arranged to automatically reverse the direction of movement of the irrigator when it approaches either of the fences 18 or 20. One means of achieving this is shown in FIG. 13. One or more of the A-frame structures 180 at the center of the irrigator boom is provided on either side with insulated hanging probes 150a, 150b located at the level of the fences 18, 20. The probes are electronically connected to the controls which control the movement of the irrigator. When the irrigator is travelling anticlockwise, the probe 150a is displaced when it comes up against the fence 18. This causes the irrigator to change direction so that it now travels clockwise. In due course the probe 150b is displaced when it comes up against the fence 20, causing the irrigator to again change direction and travel anticlockwise.

In an alternative example of the invention which is particularly useful when the fences 18, 20 (or the fences 408 which define the sectors 410 of the block 400 shown in FIG. 5 as will be described) are comprised of electrified wire or tape which is flexibly supported, the irrigator 32 does not change direction when it comes up to the fences, The A-frame structures 180 are arranged simply to ride over the fence wires. The tyres on the wheels 182 are typically of about 1.5 meters diameter and the treads thereof have no difficulty in engaging the fence wire and forcing it down to the ground. Where the fencing is electrified, the current is usually switched off automatically by the processor when the irrigator rides over it.

Where the structures 180 have any parts such as indicated at 184 between the wheels which might snag the fence wire, it is necessary to provide fairing such as indicated at 186 to prevent this. Furthermore, it is necessary to ensure that each of the A-frame structures 180 is positioned so that, as it moves around the land, it does not encounter any of the other equipment located on the land, such as the spoked wheels of the TUMBLEWHEEL system, the posts 411 or the feed or water troughs described below.

The irrigator is supplied with water and power through piping and cables which are laid underground where they cross the land 10.

In a typical facility installed on a circular farm of, say, 125 hectares, each of the fences 18, 20 will be in excess of 600 meters in length. The fences 18, 20 may comprise two lengths (one above the other) each of conventional single strand steel fencing wire. However, the farmer may prefer to use conventional so-called 'hot wire' or 'hot tape' for the fences 18, 20. Modern hot wire often comprises fine conductive wires, usually of stainless steel, carried by a carrier in the form of a rope or line comprised of plastics filaments. Hot tape is similarly constructed but the carrier is in the form of a relatively flat tape. The carrier provides strength, lightness, durability and visibility. The conductive wires are charged to a high voltage. Animals soon learn to keep clear of an electrified fence on account of the electric shock which they receive if they touch it.

It is common practice to use long lengths of hot wire and hot tape to provide temporary movable fencing for dividing up fields or paddocks. There are well known techniques and hardware for erecting and moving such fencing. For example, one system for suspending a long length of hot wire over a paddock is marketed by the Gallagher organisation in New Zealand under the trade mark TUMBLEWHEEL and uses spoked rollers which are insulated from the hot wire and which roll over the ground. The TUMBLEWHEEL system may be employed in the practice of the present invention.

Because the fences 18, 20 are moved from their ends, they will not in practice be straight. They will instead be loop shaped as indicated in FIG. 1.

The inner ends of the fences 18, 20 are conveniently attached to the posts 42 and are manually moved forward from post to post by the farmer as necessary.

A vehicle 28 is provided for moving the fence 18 around the boundary 12. A second vehicle 30 may be provided for similarly moving the fence 30. Advantageously the vehicles 28, 30 move independently of each other.

In the present example, the vehicle 28 to which the leading fence 18 is attached moves (in the example shown in FIG. 1) anti-clockwise around the boundary of the land, towing the leading fence 18. The movement of the vehicle 28 may be partly or fully automated and could also be controlled by an electronic processor which may be controlled by the same programme which controls the irrigator. Guiding means is provided for guiding the vehicle 28 so that it stays in the correct path for keeping the fence 18 taut without breaking it. Where a perimeter fence is provided around the boundary 12, the vehicle 28 may be guided by a probe 200 which rides on the wire 80 of the fence and senses the proximity of the vehicle to the perimeter fence. The probe 200 is mounted on an arm 202 carried on a vertically disposed pin 204. The pin pivots in the frame 206 of the vehicle and is integral with the half shaft 208 which carries one of the front wheels 210 of the vehicle. The half shaft 208 is also integral with a steering arm 212 which is connected through a tie rod 214 to the steering arm 216 of the other front wheel 218 of the vehicle. A tension spring 220 links the arm 202 with a lug 222 on the frame. The spring 220 keeps the probe 200 in contact with the fence 80. When the arrangement is set up correctly, the spring loaded arm 202 steers the vehicle as it moves forward which remains at a constant distance from the perimeter fence.

The vehicle 28 carries the wire of the fence 18, a means for electrifying the wire and an arrangement to apply a constant tension to the wire. This arrangement comprises an arm 230 which at one end carries a pin 232 which pivots in a box 234. A tension spring 236 links the arm with a lug 238 fixed to the frame 206 of the vehicle. At its opposite end the arm 230 carries a sheave 240. The wire passes around the sheave to a bobbin 242 around which the wire is wound. The spring 236 counteracts the tension applied by the wire to the arm 230 through the sheave. The bobbin is driven through a gear box by an electric motor 244 mounted on the frame 206 of the vehicle.

Figure 8:
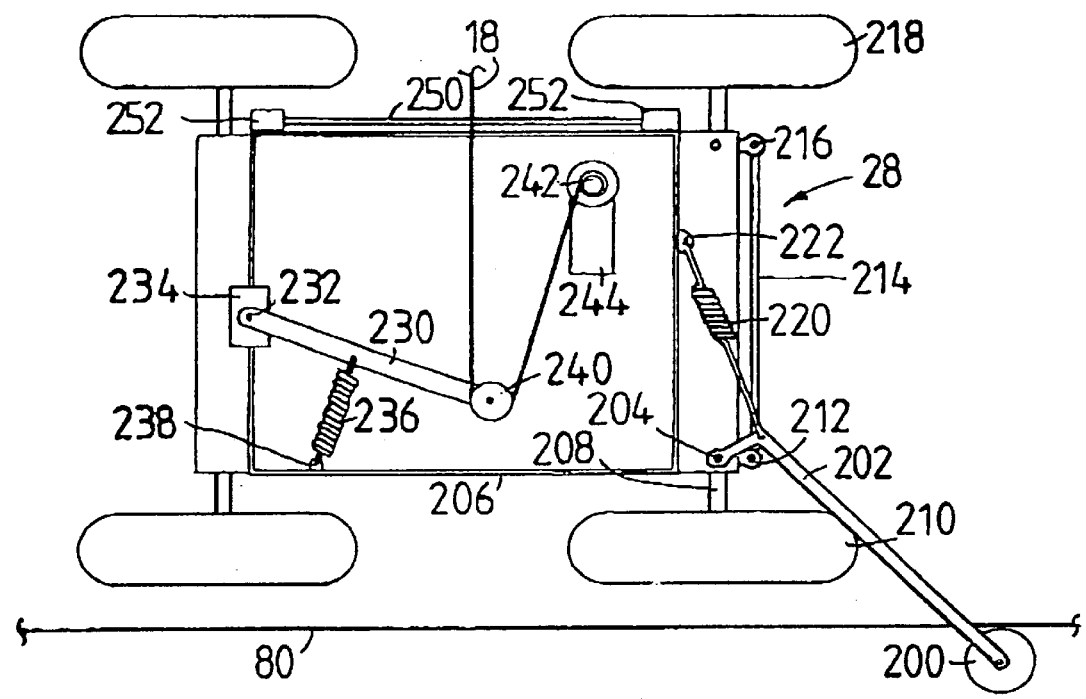
FIG. 8 is a somewhat schematic plan view of a vehicle for moving the movable fence and equipped with a guiding means.

Two limit switches are located in the box 234 and are arranged when actuated to connect the motor 244 to a power source such as a battery. If, due to the movement of the vehicle, the tension in the wire of the fence 18 diminishes, the arm 230 pivots clockwise in FIG. 8 due to the force in the spring 236. Through the pin 232 this actuates one of the limit switches which causes the bobbin, driven by the motor 244 to draw the wire onto itself and increase the tension. On the other hand, if the tension in the wire increases the arm 230 pivots anti-clockwise. This causes the second limit switch to be actuated and the motor 244 drive the bobbin in the reverse direction thereby causing the arm 230 to pivot anticlockwise, decreasing the tension in the wire.

The wire of the fence 18 is charged by virtue of bearing on a metal rod 250 mounted on the frame of the vehicle by means of two mountings 252 of insulating material. The rod is connected to a conventional high voltage charging device carried on the vehicle.

The provision of the combined means to steer the vehicle and to draw or release the wire of the fence 18 enables a constant tension to be kept on the wire. One advantage of this is to facilitate the passage of the A-frame structures 80 over the fence 18.

Figure 11:
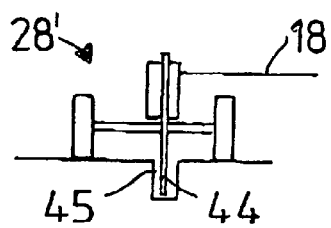
FIG. 11 is a schematic front view of a second vehicle for moving the movable fence.

Since the stock is normally confined to the paddock 26 between the fences 18, 20 it is not essential that the perimeter fence 24 should extend around the entire outer boundary 12 of the land. The fence 24 need extend only between the outer ends of the fences 18, 20. In this case, as shown schematically in FIG. 11, as an alternative guiding system, the vehicle 28' may be provided with a probe 44 which is connected to the steering system of the vehicle and which, as the vehicle traverses the ground, moves along a guide such as, for example, a furrow 45 dug in the ground along the circumference of the land. Movement of the probe relative to the vehicle causes the vehicle to be steered to maintain a constant distance between the vehicle and the furrow and thus between the vehicle and the center point of the land. The fence 24' could be conveniently attached to the vehicles 28' and 30 which move the fences 18, 20. The vehicle 30 could in fact be towed forward by the vehicle 28'.

Figure 14:
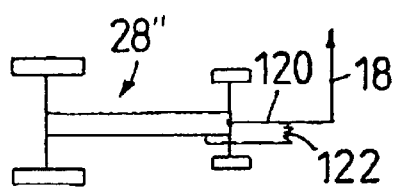
FIG. 14 is a schematic plan view of a third vehicle for moving the movable fence.

Another means for guiding the vehicle is schematically shown in FIG. 14 which also does away with the need for a perimeter fence. In this case a forwardly projecting, rigid arm 120 is pivotably mounted on the vehicle 28" and is linked to the steering system thereof. The outer end of fence 18 is connected to the front of the arm 120, the tension in the fence tending to pull the arm inwards and thus cause the vehicle to steer inwards. A tension spring 122 urges the arm outwards, counteracting the force applied by the fence. By balancing the force of the spring against the force of the fence, the vehicle can be caused to steer a circular path around the center of the land.

Any suitable type of vehicle 28, 28', 28" may be used. It is envisaged at present that it may be a small tractor provided with a battery powered electric motor in place of its standard internal combustion engine. It will thus be able to operate without significant noise. It may carry solar cells for keeping the batteries charged. Alternatively it may pick up power from the fence 18. For this purpose the fence 18 may carry a power cable.

Although the vehicle to which the trailing fence 20 is connected may also move automatically around the boundary of the land (or, as noted, be drawn by the vehicle to which the leading fence 18 is attached), this is not considered desirable at present. The reason for this is to avoid the possibility that the trailing fence 20, as it moves forward, will come into contact with animals which are asleep or sick or immobile for any other reason. At the present time it is not certain how different animals will react to a fence advancing automatically towards them. It is therefore considered sufficient that the fence 20 be moved periodically by the farmer. This is easily possible if hot wire or hot tape is used for the fences 18, 20. In this case it is not necessary that the vehicle 30 be dedicated to the movement of the trailing fence 20—in fact the vehicle 30 may for example be a motorcycle, utility vehicle or the like which the farmer uses for getting around the farm.

The fence at the perimeter of the enclosure may be of any suitable kind. In one example of the invention, the fence comprises a series of gates 22. The gates 22 may be of any suitable known kind such as swing gates, electrified spring gates, or lengths of hot tape. In the present example, conventional swing gates are used. The swing gates may be mounted on, or suspended between, posts 42 spaced around the perimeter of the enclosure. The swing gates 22 can be held closed by any suitable conventional means as by chains or hoops which are attached to the gates and pass over the posts 42 in well known manner.

Figures 2, 16:
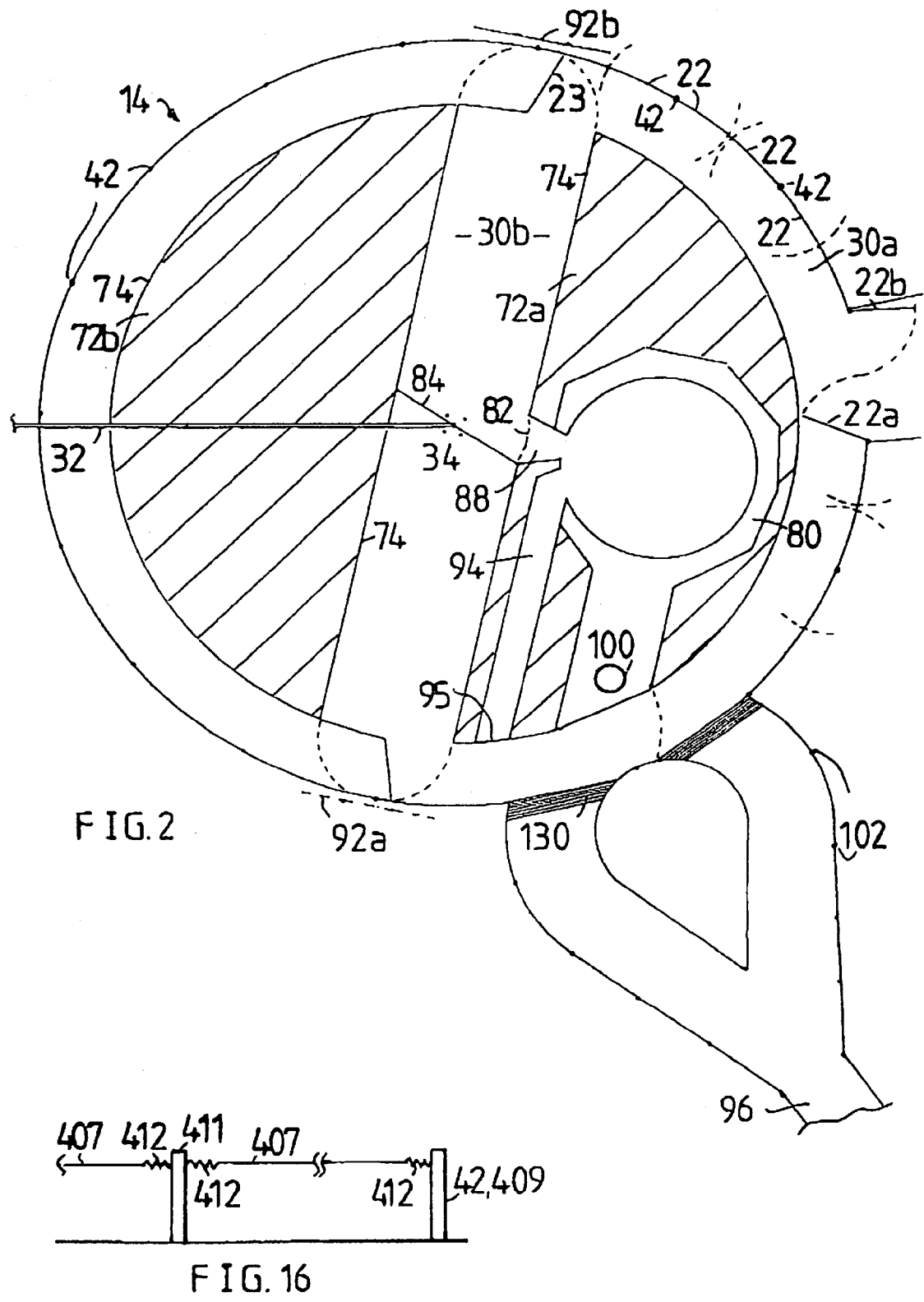
FIG. 2 is a plan view of the layout of an enclosure 14 located at the center of the land 10.
FIG. 16 is a schematic view of part of a fence.

The enclosure 14 is provided with a concrete pad 30 indicated by the unhatched area in FIG. 2. The hatched areas indicate spaces 72a, 72b in the enclosure which, to save cost, need not necessarily be sealed by concrete. The concrete pad 30 comprises an annular portion (which for convenience will be referred to as the 'annular pad' 30a) located just within the circumference of the enclosure 14; and a straight portion (which will be referred to as the 'cross pad' 30b) extending diametrically across the annular portion 30a. A conventional rotary milking shed 80 is constructed in one of the spaces 72a. When the swinging gates 22 are all closed they constitute a barrier or fence which extends around the outer periphery of the annular pad 30a.

Fences 74 located about the boundary of each unsealed space 72. These fences 74 close off the inner periphery of the annular pad 30a and both sides of the cross pad 30b. A gap 82 in the fence 74 bounding the right hand side of the cross pad opens to a passageway 88 leading to the milking shed 80. A drafting gate 84 is mounted on the support structure 34 which is located at the center of the enclosure and supports the inner end 36 of the irrigator boom 38.

The entire pad 30 is thus fenced on all sides. The gates 22 are normally closed. However, the two swinging gates 22 which at any one time are aligned with the paddock 26 between the fences 18, 20 can be opened, one swinging inwardly to the position shown at 22a and the other swinging outwardly to the position shown at 22b. The cows can thus pass out of the paddock 26 and onto the annular pad 30a.

The gate 22b forces the cows to move in one direction only (anti-clockwise in FIG. 2) around the annular pad. They then move onto the cross pad 30b. A gate 23 (located at the upper end of the cross pad in FIG. 2) can be swung across the annular pad to force the cows onto the cross pad. Furthermore an electrified backing gate 90 (which can be of conventional design or may advantageously be of the design disclosed in the applicant's Australian patent application #57853/94) can be provided, moving as required between positions 92b and 92a, to drive the cows onto and along the cross pad towards the drafting gate 84. In the example shown in FIG. 2, the drafting gate 84 has been set in the position shown in solid outline so that the cows to be milked are forced to move from the cross pad through the gap 82 into the milking shed 80.

If the herd is large, the swing gate 23 can be swung to leave both the annular pad and the cross pad open and any of the other gates 22 further around the annular pad (in an anticlockwise sense in FIG. 2) from the upper end of the cross pad in FIG. 2, can be swung inwardly to close off the annular pad. This has the effect of increasing the space available on the annular pad and the cross pad to accommodate the cows while they are proceeding into (or waiting to proceed into) the milking shed.

For a really large herd, the cows can occupy the entire annular pad and cross pad while they are waiting to be milked.

An important advantage of the invention is that the annular pad and the cross pad serve as both a laneway and a yard for the cows. The capital cost of construction of the pads is less than for conventional laneways and yards. The outer diameter of the enclosure 14 will typically be about 60 meters so this represents a considerable cost saving.

Where needed, pairs of the gates 22 can be swung across the annular pad to create a pen for the cows.

A fenced laneway 94 leads from the exit of the milking shed through a gate 95 in the fence 74 back onto the annular pad 30a. The swing gate 23a can be closed to force the cows to return along the annular pad to the paddock 26. By the time this happens the remainder of the herd (i.e. the cows still waiting to be milked) will already have proceeded out of the paddock 26 The position of the gates 22a, 22b can then be reversed to allow the cows proceeding from the milking shed to return to the paddock 26.

A roadway 96 is constructed, ending in a loop-98 located adjacent the enclosure 14. The roadway is curved to conform to the shape of the fences 18, 20. This is to minimise the distance which the fences 18. 20 must be moved in order to cross the roadway. The roadway is used, inter alia, by milk tankers for collecting the milk stored in a conventional milk vat. It is considered that the optimum location of the milk vat is at the position 100, i.e. as close as possible to the milking shed. To get the tanker as close as possible to the milk vat, part of the annular pad is used as the tanker loop 98. Where the loop adjoins the annular pad, the gates 22 can be replaced by cattle grids 130 so that the tankers can use the loop without being held up in having to open the gates 22.

The tanker loop 98 and milk vat may alternatively be located in the space 72b. However, the milk line to the vat would then be somewhat longer.

To keep animals off the loop 98, a number of insulated posts 102 are erected around the loop. The hot wire of the fences 18, 20 simply curves around the posts as the fences 18, 20 are in turn moved up to the roadway. The fences are lifted over the posts by the farmer when they are moved across the roadway.

Figure 3:
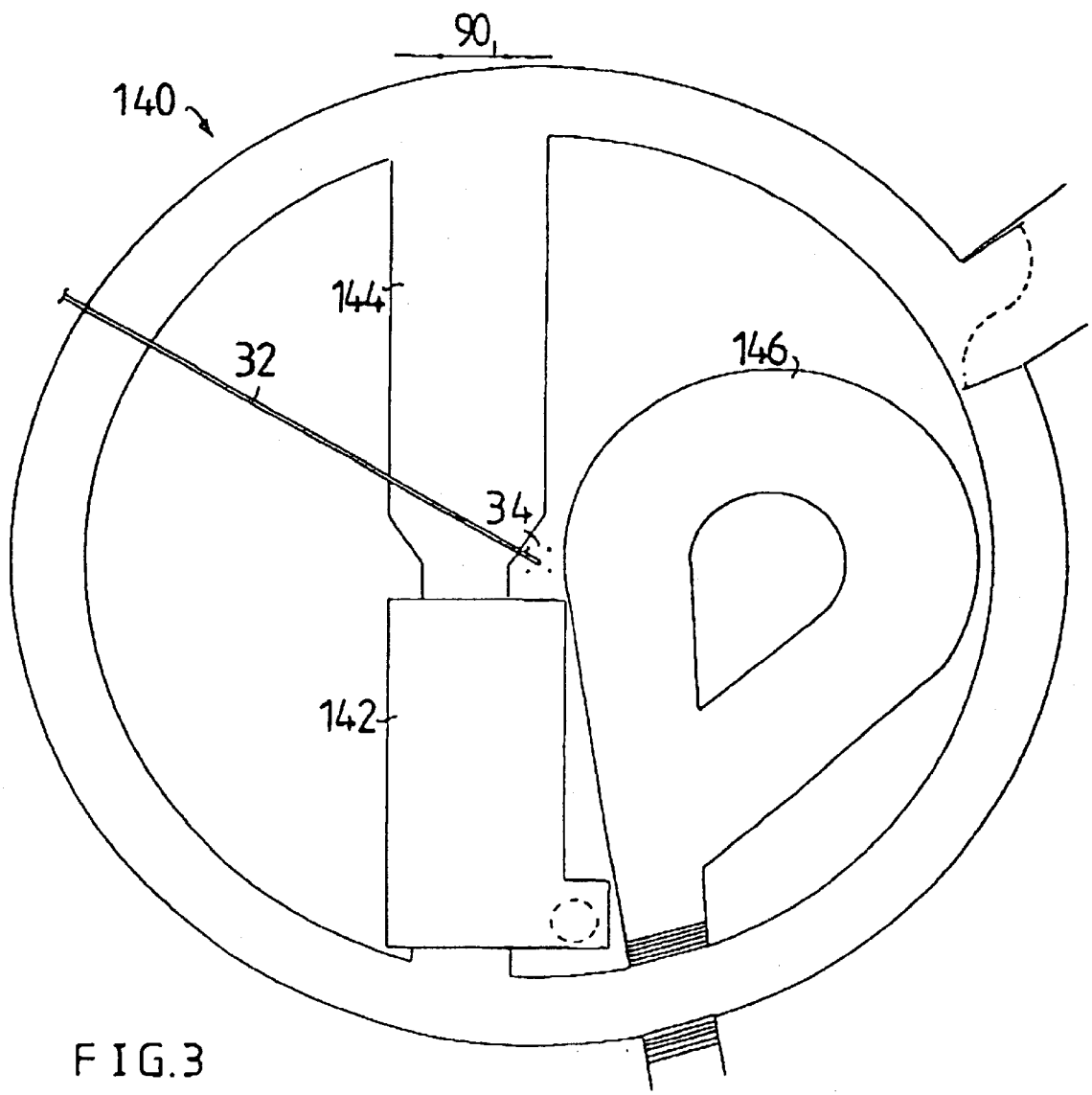
FIG. 3 is a plan view of an alternative layout of an enclosure.

An alternative layout for the enclosure is shown at 140 in FIG. 3. The principle difference between the enclosure 14 and the particular arrangement of the enclosure 140 is that, in the enclosure 140, a herring bone milking shed 142 is provided, located in alignment with a foreshortened cross pad 144. It is to be understood that the enclosure 140 has substantially all of the features as the enclosure 14 and these features will not be described in detail except where they differ. The cross pad 144 is off set from the center of the enclosure 140 and the support structure 34 for the irrigator boom is therefore located to one side of the cross pad.

One advantage this layout is that the tanker loop 146 is accommodated entirely within the enclosure 140. However, this advantage may be diminished if, as is possible, a rotary milking shed was used instead of the herring bone shed since there may be insufficient space inside the enclosure 140 to accommodate both.

As shown in FIG. 15, the support structure 34 is mounted on a raised concrete foundation 34*a* so that the top of the structure is about six meters above the ground, i.e. somewhat higher than the structure which supports an irrigator boom in conventional use. This is to enable the inner end of the boom 38 to clear the buildings in the enclosure 14, 140. The irrigator is supplied with irrigation water and electrical power by piping and cables led through the support structure 34 in conventional manner.

Yet another alternative layout for the enclosure is shown at 340 in FIG. 4. In this case a conventional herring bone milking shed 342 is provided, located in alignment with a cross pad 344. The cross pad and milking shed are located on a diameter of the enclosure. The cross pad is shorter but wider than the cross pad 144 in the enclosure 140 so that the capacity of the cross pad 344 to accommodate cows awaiting milking is not affected. However, the milking shed 342 is located over the rotational center of the irrigator and it is consequently necessary for the milking shed to be constructed so that it incorporates the structure 34 and is capable of supporting the inner end of the irrigator above the roof of the milking shed.

Again, the enclosure 340 has substantially the same features as the enclosure 14 and these features will not be discussed except insofar as any differences therein require explanation. One such difference is that the milk vat of the enclosure 340 is located at 348, outside the annular pad 346. Moreover, in the example shown, the tanker loop 350 is located beyond the shed for the milk vat.

In the enclosure 340, one of the gates 22 (indicated at 22*d*) is used to close off the left hand portion of the annular pad 346 to force the cows onto the cross pad 344 thus dispensing with the gate 23 provided in the enclosure 14.

In the enclosure 340, wash water outlets 352 are provided in the annular pad adjacent the ends of the cross pad 344 and the milking shed 342. From the positions of these outlets, the annular pad and the cross pad respectively slope downwardly to drains 354 covered by grates in the cross pad and to the pit 356 in the milking shed. A drain is provided at the position 358 in the pit. It is a useful feature of the invention that the large capacity pump which feeds water to the irrigator can also be used to feed the water to the outlets 352. The pads and the milking shed can thus be washed down by water which is delivered at a high rate (typically 100 liters/sec) thus considerably speeding up the washing down process. It is necessary for the wash down water to be pumped away from the drains.

The enclosures 14 and 140 can each be provided with a similar wash down arrangement.

Figure 10:
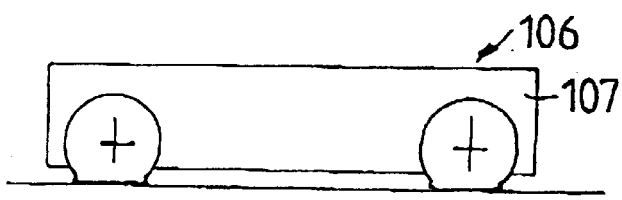
FIG. 10 is a side view of a water trough.
Figure 9:
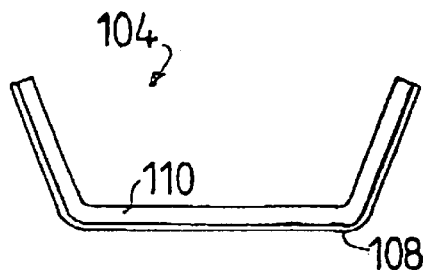
FIG. 9 is an end view of a feed trough.

As shown in FIGS. 1, 9 and 10, movable feed troughs 104 and water troughs 106 are provided in the paddock 26. In the present example a feed trough comprises a sheet 108 of conveyor belting or similar tough, flexible material formed into a trough shape by a number of rigid U-shaped members 110 fixed to the upper face of the material at intervals along its length. The members 110 may for example be fabricated from lengths of square steel tubing bent to shape. The sheet 108 may be, say, 25 meters long. The trough can therefore contain a lot of feedstuff and it is not necessary to close off the ends of the trough. The construction enables the trough to be dragged over the ground by a tractor. To this end a loop of chain may be connected to one end of the sheet 108 so that the driver of the tractor can hook the chain and drag the trough to a new location without dismounting from the tractor.

The water trough 106 may simply comprise a rigid bath 107 of, for example, steel or the like mounted on wheels as shown in FIG. 10. The wheels are preferably soft and the trough advantageously has a flat bottom located close to the ground so that it is not easily tipped over. The water trough is connected by a length of flexible hose 112 to the nearest one of a series of valves 114 positioned at intervals around the perimeter of the enclosure 14. As in conventional practice, a ball valve is mounted at the outlet end of the hose for automatically controlling the level of water in the trough. Advantageously, the water trough is positioned so that the hose lies on the ground behind the fence 20, i.e. outside of the paddock 26. It is sufficient if the farmer uses a tractor simply to tow the water trough forward before moving the fence 20 forward. As the paddock advances, it will be necessary for the farmer from time to time to connect the hose to the next valve. He would do this at the same time as he moves the inner end of die trailing fence 20 forward.

Alternatively, a pipe may be laid underground, concentric with the enclosure and positioned about half way between the perimeter of the enclosure and the fence 24. This pipe would have valves spaced along its length to which the hose 112 could be connected as needed.

Feed troughs may also be placed inside any of the enclosures 14, 140, 402 to enable the cows co feed while they are waiting on the annular pad to be milked.

Figure 6:
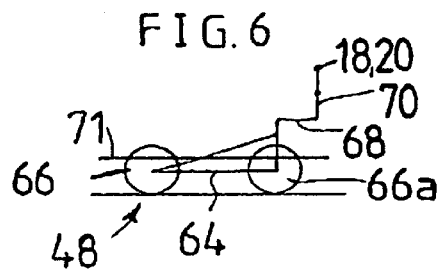
FIG. 6 is a schematic side view of a device for supporting a movable electrified fence.
Figure 7:
FIG. 7 is a schematic side view of a second device for supporting a movable electrified fence.

The insulated spoked wheels of the TUMBLEWHEEL system are not tethered to each other. They may thus migrate along the fences 18, 20 as they are moved. As an alternative to the TUMBLEWHEEL system, the means of supporting the hot wire or hot tape used for the fences 18. 20 may comprise a series of spaced, movable supports in the form of skids 46, as shown in FIG. 7 or light weight wheeled carriages 48 as shown in FIG. 6. The skid 46 shown comprises a length of stiff wire bent to a shape resembling a sled; ie the wire comprises two spaced, straight, mutually parallel portions 50 each of which has a portion 52 at its forward end which curves upwardly and back over the straight portion 50. The portions 52 meet each other at a point 54 located centrally between the straight portions 50. An insulated post 58 is mounted at the point 54 and the hot wire of the fence 18 (or 20) is attached to the post.

The skid 46 rests on the straight portions 50 which simply slide over the ground as the fence 18. 20 is drawn forward.

The carriage 48 comprises a frame 64 which may be constructed of rigid plastics or metal tubing. Two spoked wheels 66 are mounted at the rear of the frame 64. A front wheel 66*a* is carried between the legs of an A-frame 68 which is mounted on the frame 64 so as to be able to pivot about a vertical axis. The A-frame projects forwardly from the front wheel 66*a* and a post 70 projects upwardly from the apex of the A-frame. The post is mounted on but insulated from the A-frame. The hot wire of the fence 18, 20 is mounted on the post. The arrangement enables the carriage 48 to steer itself automatically under the tension in the hot wire to maintain its correct position along the fence 18. 20.

A loop 71 of hot wire may be mounted on the frame 64 surrounding the carriage. The loop is connected to the post 70 and thus energised by the hot wire of the fence 18, 20. This loop 71 prevents the carriage from being pushed over or otherwise interfered with by the cows.

Whatever form of supports are used for the wire of the fences 18, 20, the supports will typically be spaced about 10 meters apart The diameter of the block of land in any of the examples herein might typically be about 1200 meters. In such a case the rate of advance of the movable fences 18, 20 might be such that they make one revolution about the land in 20–40 days though this might increase to about 60 days in areas where rainfall is plentiful.

Figure 5:
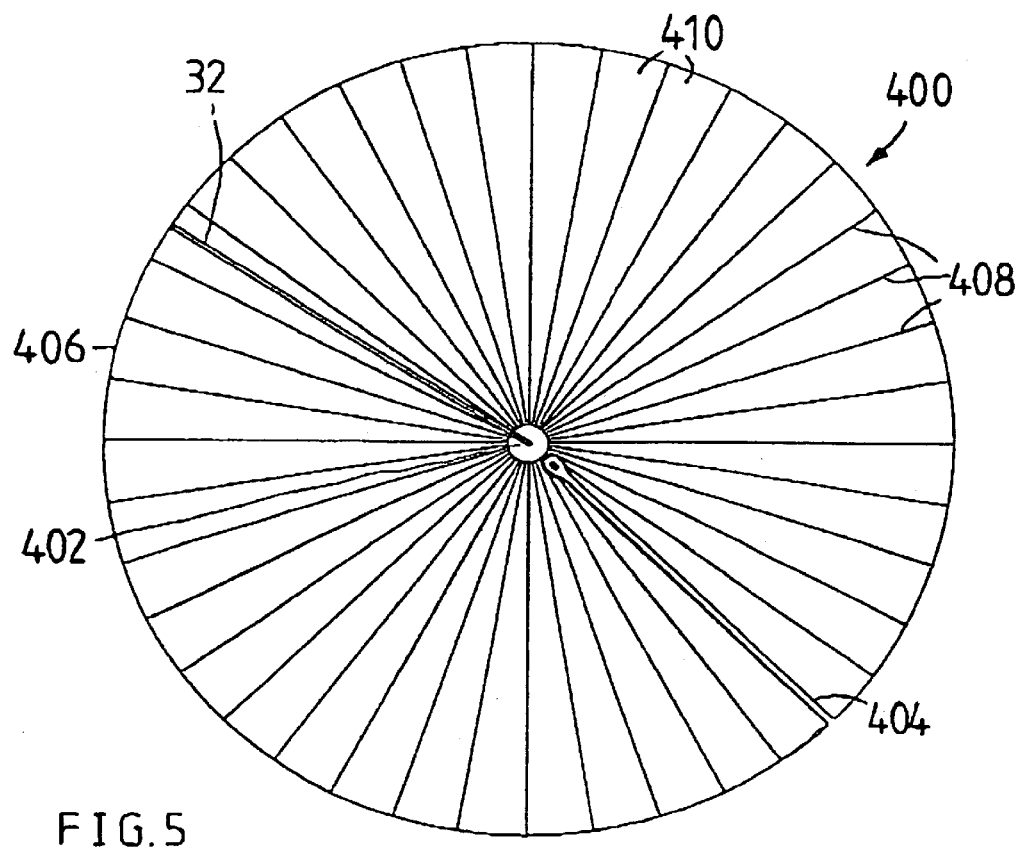
FIG. 5 is a plan view of block of land also with a circular boundary but divided by fencing in fixed position into a number of separate paddocks.

FIG. 5 shows a circular block of land 400 having at its center an enclosure 402 which can be identical to any of those already described. Also, a rotary irrigator 32 of the same type as already described is provided for irrigating the land 400. A tanker road 404 is provided with a tanker loop at its inner end. In the present case the road 404 is straight. A perimeter fence 406 of any suitable type is provided.

The moving fences 18,. 20 are not used in the present case. Instead, the land 400 is divided by permanent fences 408 of any suitable kind into a number of paddocks 410 of uniform size. The inner ends of the wires 407 of the fences 408 are conveniently mounted on the posts 42 which support the gates 22 around the enclosure. The outer ends of the wires 407 can be mounted on the posts 409 which support the perimeter fence 406. Between their ends the wires 407 can be supported at intervals by posts 411.

By way of example, assume that the area of the block of land is about 110 hectares and that it is divided into forty two paddocks 410. Each such paddock would occupy an angle of about 8.6° of the land. This number of paddocks is chosen so that a herd of dairy cows of typical size grazed in one of such paddocks would exhaust the pasture in the paddock in about 12 hours. i.e. between two milkings where milking is carried out twice a day. In a case in which the irrigator rotates about the land about once in every three days, it would advance through an angle of about 60° in the 12 hours between milkings. Under these conditions, the optimum time for regrowth of the pasture might be about 21 days so that each pasture should optimally be grazed once every 21 days. Advantageously, pasture which is about to be grazed is as dry as possible. Furthermore, to start the regrowth of grazed pasture as quickly as possible, it would be advantageous to irrigate a paddock with the irrigator immediately after the paddock has been grazed. Therefore, the above mentioned objects and advantages would be achieved by putting the herd successively into every seventh paddock (i.e. paddocks which are 7×8.6°=60.4° apart) after each milking and adjusting the rate of advance of the irrigator to 60.4° between milkings.

There are seven sets of paddocks 410. Each set comprises six paddocks spaced uniformly around the block. In the first three day cycle of the irrigator, the paddocks in the first set are grazed, one after the other. In the second three day cycle, the paddocks in the second set are grazed. And so on. The paddocks in the one set are located adjacent the paddocks in the preceding set. To accommodate this, the processor is programmed to advance the irrigator through eight paddocks at the end of each three day cycle and to increase rate of delivery of irrigation water to compensate for the increase in speed of the irrigator in this phase.

The conditions given in the above example could clearly be adjusted to suit different circumstances.

In a farm of the above type the fences 408 would have to be constructed so that the A-frame structures 180 of the irrigator could ride across the fences. For this purpose, as shown in FIG. 16, the fence wires 407 might be linked to the posts through springs 412 which take up the additional tension applied to the wires when they are depressed as the structures 180 pass over them.

An advantage of the layout of any of the farms shown herein is that there are no raceways. The distance which the cows have to walk from the paddock in which they are grazing to the milking shed is less than on conventional farms. The cows are thus able to spend more time grazing and the operator has to spend less time tending to the cows as they are moving to the milking shed.

Probably the most important advantage of the use of moving fences 18, 20 is that the speed of advance of the fences and the irrigator and the size of the paddock defined by fences can be varied as required to suit, inter alia, the number of animals being raised, the rotation of stock, and local growing conditions including differing rates of growth of various grasses in each season of the year. If necessary, the grazing can he supplemented by feed and the amount of feed can be adjusted to ensure that the grass is eaten down to optimum size and also regenerates to optimum size on each rotation of the fences.

The irrigator is operated to provide the pasture with the equivalent of, say, 1" of rain every three days. The use of an irrigator is considerably less wasteful of water than flood irrigation which has the additional disadvantage that pasture growth stops for about 24 hours after the land is flooded.

The speed of advance of the fences can also be controlled from minute to minute by the processor. For example, it is known that cows feed best in the hour before they are milked and it is also of course known that the rate at which cows feed varies through the day and night. The processor can be programmed to advance the fence 18 to uncover new pasture for the cows in the hour before they are milked and to slow the advance of the fence 18 (or even stop it altogether) at the time of day when the cows are unlikely to be feeding.

The fence 18 can also be advanced rapidly to uncover new pasture for the cows immediately after they have been milked to encourage them to leave the milking shed and return to the paddock.

Because the irrigator is processor controlled, the speed of movement of the boom 38, or the rate of delivery of water through the boom, can be altered from minute to minute. The boom can thus, for example, be speeded up when it is in the region of the leading fence 18 in order to avoid watering the ground too heavily in front of the cows. Similarly, the boom can be slowed down when it is in the region of the trailing fence 20 so that excrement from the cows can be washed off the pasture, thus speeding regrowth.

Because the feed troughs are located in the paddocks, another advantage of the invention is that the amount of feed spillage, dung and urine deposited by the cows in the enclosure is diminished since the cows feed from the feed troughs after they have been milked.

The annular pad 30a can also be used as a road for tractors and farm vehicles to get from the sector 40 or the roadway 96 into the paddock 26.

When the gates 22a, 22b are opened at milking time, the cows will be driven out of the paddock 26 according to the farmer's customary routine. This is often achieved with the help of a dog. An advantage of the invention is that the farmer, working at the milking shed, can easily see what is happening at the gates 22a, 22b. Milking can be started even before all of the cows are out of the paddock.

The circular farm 10 described can of course be part of a bigger, conventionally operated farm.

It is believed that the facilities described will lend themselves readily to robotic milking should this become generally practised. One reason for this is that the cows are likely to be willing to walk through the milking shed, even when it is robotically operated, in order to get to the fresh pasture in the paddock. In the case of the block 400, this fresh pasture is in the new paddock. In the case of the block 14, the fresh pasture might be located in a second paddock located diametrically opposite the first paddock 26. The second paddock will be defined by a second pair of fences 18, 20 and the two paddocks will be moved around the farm in tandem.

It is not intended that the scope of a patent granted in pursuance of the application of which this specification forms a part should exclude modifications and/or improvements to and/or known equivalents of any matter described and/or illustrated herein which are within the scope of the invention as claimed or be limited by such matter further than is necessary to distinguish the invention from the prior art.

I claim:

1. Apparatus for farming including an enclosure for enclosing animals which enclosure is located on a block of land on which the animals are grazed, fencing means which divides the land into sectors extending from the enclosure, irrigator means arranged to irrigate the sectors selectively, and means for allowing a herd of the animals to move selectively between the sectors and the enclosure.

2. Apparatus according to claim 1, in which the fencing means includes movable fencing which defines a sector which is located in a position which can be changed by moving the fencing around the enclosure.

3. Apparatus according to claim 2, in which means is provided for moving the fencing in a substantially circular path around the enclosure.

4. Apparatus according to claim 2, in which the movable fencing comprises first and second fence arrangements which extend from the enclosure and are movable independently around the enclosure.

5. Apparatus according to claim 4, in which means is provided for moving at least one of the fencing arrangements automatically around the enclosure.

6. Apparatus according to claim 5, in which the means for moving said at least one of the fencing arrangements automatically around the enclosure comprises a vehicle and means is provided to cause the vehicle to move in a substantially circular path around the enclosure.

7. Apparatus according to claim 6, in which a substantially circular fencing arrangement is provided around the block of land for confining the animals within the block, the means to cause the vehicle to move in the substantially circular path around the enclosure including means arranged to steer the vehicle by sensing the circular fencing arrangement.

8. Apparatus according to claim 1, in which the fencing means includes a series of spaced fence arrangements which are located in substantially fixed positions and extend over the land from the enclosure.

9. Apparatus according to claim 1, in which the enclosure is provided with a passageway which extends around the enclosure and has an outer periphery in which is provided the means for allowing the animals in the herd to move between the sectors and the enclosure, said means comprising a number of closures selected ones of which can be opened to give access between a sector and the enclosure.

10. Apparatus according to claim 9, in which the outer periphery of the enclosure is substantially circular.

11. Apparatus according to claim 9, in which a dairy is provided in the enclosure for milking the animals.

12. Apparatus according to claim 9, in which a dairy having an entrance and an exit is provided in the enclosure for milking the animals, the passageway having an inner periphery within which the dairy is located, means being provided for giving access from the inner periphery of the passageway to the entrance of the dairy and for giving access to the passageway from the exit of the dairy.

13. Apparatus according to claim 1, in which the irrigator means is arranged to move around the enclosure in a substantially circular path.

14. Apparatus according to claim 13, in which the irrigator means comprises a centre pivot irrigator.

15. A method of farming including the steps of providing an enclosure for enclosing animals which enclosure is located on a block of land on which the animals are grazed, providing fencing means which divides the land into sectors extending from the enclosure, irrigator means arranged to irrigate the sectors selectively, and providing means for allowing a herd of the animals to move selectively between the sectors and the enclosure.

16. A method according to claim 15, in which the fencing means includes movable fencing which defines a sector which is located in a position which is changed by moving the fencing around the enclosure.

17. A method according to claim 16, including the step of causing the irrigator means to move around the enclosure in a substantially circular path.

18. A method according to claim 17, in which the irrigator means comprises a centre pivot irrigator.

19. A method according to claim 16, including the step of providing means for moving the fencing in a substantially circular path around the enclosure.

20. A method according to claim 16, in which the movable fencing comprises first and second fence arrangements which extend from the enclosure and are moved independently around the enclosure.

21. A method according to claim 20, in which means is provided for moving at least one of the fencing arrangements automatically around the enclosure.

22. A method according to claim 21, in which the means for moving said at least one of the fencing arrangements automatically around the enclosure comprises a vehicle which is caused to move in a substantially circular path around the enclosure.

23. A method according to claim 22, including the steps of providing a substantially circular fencing arrangement around the block of land for confining the animals within the block, and providing means to cause the vehicle to move in the substantially circular path around the enclosure by sensing the circular fencing arrangement.

24. A method according to claim 15, including the step of providing fencing means which includes a series of spaced fence arrangements which are located in substantially fixed positions and extend over the land from the enclosure.

25. A method according to claim 15, including the step of providing the enclosure with a passageway which extends around the enclosure and has an outer periphery in which is provided the means for allowing the animals in the herd to move between the sectors and the enclosure, said means comprising a number of closures selected ones of which are opened to give access between a sector and the enclosure.

26. A method according to claim 25, in which the outer periphery of the enclosure is substantially circular.

27. A method according to claim 15, including the step of providing a dairy in the enclosure for milking the animals.

28. A method according to claim 15, including the step of providing a dairy having an entrance and an exit in the enclosure for milking the animals, the passageway having an inner periphery within which the dairy is located, means being provided for giving access from the inner periphery of the passageway to the entrance of the dairy and for giving access to the passageway from the exit of the dairy.

* * * * *